(12) United States Patent
Dowens et al.

(10) Patent No.: US 9,072,074 B1
(45) Date of Patent: *Jun. 30, 2015

(54) METHOD AND APPARATUS FOR DETERMINING THE LOCATION OF A TERMINAL ADAPTOR

(75) Inventors: John P. Dowens, Red Bank, NJ (US); Christine Holmgren, Little Silver, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1585 days.

This patent is subject to a terminal disclaimer.

(21) Appl. No.: 11/645,913

(22) Filed: Dec. 27, 2006

(51) Int. Cl.
| | |
|---|---|
| H04W 4/00 | (2009.01) |
| H04L 12/66 | (2006.01) |
| H04M 11/04 | (2006.01) |
| H04M 3/42 | (2006.01) |
| H04W 76/00 | (2009.01) |
| H04M 3/51 | (2006.01) |
| H04W 4/22 | (2009.01) |

(52) U.S. Cl.
CPC .......... *H04W 76/007* (2013.01); *H04M 3/5116* (2013.01); *H04W 4/22* (2013.01); *H04M 2242/04* (2013.01)

(58) Field of Classification Search
None
See application file for complete search history.

(56) References Cited

U.S. PATENT DOCUMENTS

| | | |
|---|---|---|
| 6,707,888 B1 | 3/2004 | Cope |
| 6,956,931 B1 | 10/2005 | Cope |
| 6,963,557 B2 | 11/2005 | Knox |
| 7,027,564 B2 | 4/2006 | James |
| 7,200,207 B2 | 4/2007 | Meer et al. |
| 7,564,838 B2 | 7/2009 | McGary |
| 7,664,106 B2 * | 2/2010 | Croak et al. ............... 370/389 |
| 7,697,509 B2 | 4/2010 | Freitag et al. |
| 7,734,019 B1 * | 6/2010 | Terpstra ..................... 379/37 |
| 8,059,645 B2 | 11/2011 | Croak et al. |
| 2003/0156577 A1 * | 8/2003 | Dunlap et al. ............. 370/352 |
| 2004/0162052 A1 | 8/2004 | Jang et al. |
| 2005/0063519 A1 | 3/2005 | James |
| 2005/0190892 A1 | 9/2005 | Dawson |
| 2006/0056388 A1 | 3/2006 | Livingood |
| 2006/0072547 A1 * | 4/2006 | Florkey et al. ............. 370/352 |
| 2006/0142012 A1 * | 6/2006 | Kirchhoff et al. .......... 455/445 |
| 2007/0104183 A1 * | 5/2007 | Bakke et al. .............. 370/352 |
| 2007/0121803 A1 * | 5/2007 | Koepke et al. ............. 379/37 |

(Continued)

FOREIGN PATENT DOCUMENTS

| | | |
|---|---|---|
| EP | 1337089 A | 8/2003 |
| EP | 1589721 A | 10/2005 |
| WO | WO-2007-056186 | 5/2007 |

OTHER PUBLICATIONS

PCT Search Report and Written Opinion for PCT/US2007/005180; consists of 12 unnumbered pages.

(Continued)

*Primary Examiner* — John Blanton
*Assistant Examiner* — Thinh Tran

(57) ABSTRACT

A method and apparatus for updating location information of a customer via a terminal adaptor that is used to access network services are disclosed. For example, the method receives a request from a customer for accessing at least one network service. The method then detects a change in an Internet Protocol (IP) address associated with the customer in the request. In response, the method requests the customer to provide input relating to location information of the customer.

20 Claims, 4 Drawing Sheets

(56) References Cited

U.S. PATENT DOCUMENTS

| | | |
|---|---|---|
| 2007/0147345 A1* | 6/2007 | Lowmaster ............... 370/352 |
| 2007/0189469 A1 | 8/2007 | Croak et al. |
| 2007/0201622 A1* | 8/2007 | Croak et al. ............... 379/37 |
| 2007/0253413 A1* | 11/2007 | Citron et al. ............... 370/389 |
| 2009/0264095 A1 | 10/2009 | Khetewat et al. |
| 2010/0098062 A1* | 4/2010 | Croak et al. ............... 370/352 |
| 2011/0158228 A1* | 6/2011 | Dowling et al. ............ 370/352 |

OTHER PUBLICATIONS

PCT Search Report and Written Opinion for PCT/US2007/005186; consists of 11 unnumbered pages.

* cited by examiner

200

METHOD AND APPARATUS FOR DETERMINING THE LOCATION OF A TERMINAL ADAPTOR

The present invention relates generally to communication networks and, more particularly, to a method for determining the location of terminal adaptors used to access services on packet networks.

BACKGROUND OF THE INVENTION

Internet services such as Voice over Internet Protocol (VoIP) and Service over Internet Protocol (SoIP) services are becoming ubiquitous and more and more businesses and consumers are relying on their Internet connections for both data and voice communications needs. One of the advantages of obtaining services on an Internet Protocol (IP) based infrastructure is the flexibility of being able to access services from anywhere with an Internet connection. Namely, customers are provided with more flexible options and can obtain the same service regardless of whether the call originated from a home, a hotel, a dormitory, etc. When a customer requests for a service, the customer's telephone number and device are associated with the service.

For example, a VoIP customer may move the telephone adaptor to a new location and continues accessing services while away from home. However, some services are provided based on the physical location of the caller. For example, calls to obtain emergency service, e.g., 911 service, are routed to the closest center equipped to provide the emergency service. For example, in North America, when a customer dials 911, the Public Switched Telephone Network (PSTN) determines the caller's telephone number, associates the call with a location (address), and provides the telephone number and location of the caller to the appropriate Public Safety Answering Point (PSAP).

When 911 calls originate in a packet network such as VoIP or SoIP networks, the VoIP or SoIP service provider needs to determine the telephone number and physical location of the caller so that the information is sent to the proper PSAP through the PSTN network. For example, the service address is often obtained from the customer when the service is activated. However, due to the flexible nature of the VoIP service, the customer may move the terminal adaptor to another physical location and continues to access services. Thus, the address obtained during the service subscription may no longer be usable for calls that rely on the physical location of the caller such as E911 calls.

Therefore there is a need for a method that enables the VoIP or SoIP service provider to obtain the location of the terminal adaptor when a customer requests to access services.

SUMMARY OF THE INVENTION

In one embodiment, the present invention discloses a method and apparatus for updating location information of a customer via a terminal adaptor that is used to access network services. For example, the method receives a request from a customer for accessing at least one network service. The method then detects a change in an Internet Protocol (IP) address associated with the customer in the request. In response, the method requests the customer to provide input relating to location information of the customer.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for determining the location of terminal adaptors used to access services on packet networks, e.g., Voice over Internet Protocol (VoIP) and Service over Internet Protocol (SoIP) services. Although the present invention is discussed below in the context of VoIP and SoIP services, the present invention is not so limited. Namely, the present invention can be applied for other services with mobile customers, e.g., the cellular network.

Figure 1:
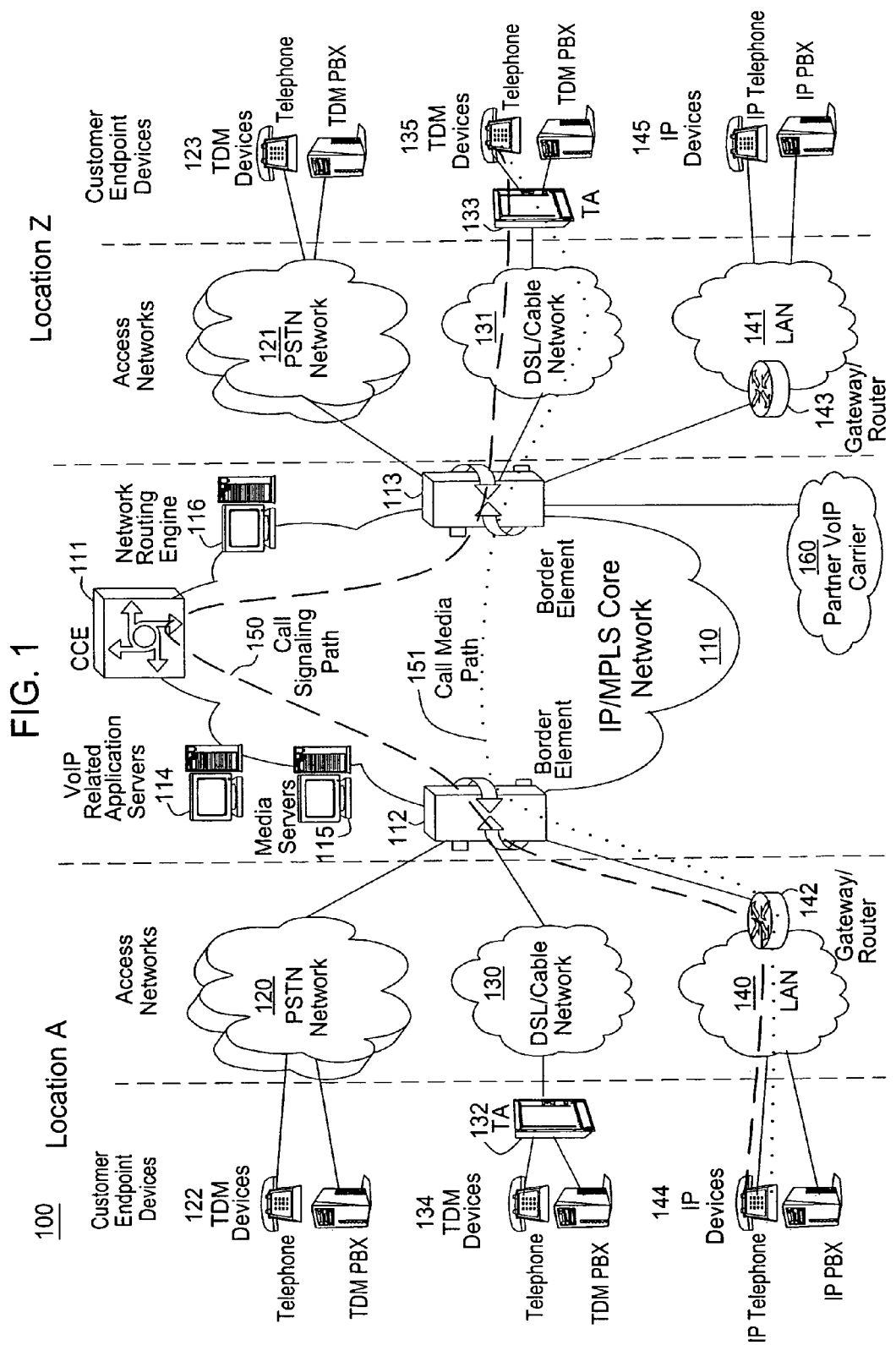
FIG. 1 illustrates an exemplary network related to the present invention.

To better understand the present invention, FIG. 1 illustrates an example network 100 related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a Voice over Internet Protocol (VoIP) network or a Service over Internet Protocol (SoIP) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network or an IP Multimedia Subsystem (IMS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Line (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router. 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well.

The above network is described to provide an illustrative environment in which packets are transported on packet networks, such as VoIP networks. One of the advantages of obtaining services on an Internet Protocol (IP) based infrastructure is the flexibility of being able to access services from anywhere with an Internet connection. When a customer requests for a service, the service provider associates the request with the customer's telephone number and device (e.g., a terminal adaptor). For example, when a customer initiates a call, the telephone service provider associates the received request with the telephone number assigned to the customer. One of the concerns customers have about relying on the IP based services for all voice and data services is the fact that some services need to be delivered based on the physical location of the user, but the call may be originated from any location with an Internet access.

For example, calls for emergency services, e.g., to a fire department, a police station, etc. are intended to be received by an emergency service provider most likely to meet the emergency need. The destination addresses for these types of telephone calls are generally assumed to be the emergency service providers closest to the caller. The services that are delivered based on the physical location of the caller are typically provided on the traditional Public Switched Telephone Network (PSTN). For example, emergency calls that require a Public Safety Answering Point (PSAP) are provided on the traditional PSTN network. In North America, 911 calls are provided through the PSTN. The calls are delivered based on the geographical location of the caller to the closest PSAP.

However, if the 911 calls are originated by packet network users, such as VoIP and SoIP customers, the calls may traverse other networks prior to being terminated, but these calls are still eventually sent to the public safety answering point in the PSTN network. For example, the VoIP or SoIP service provider identifies the caller and the caller's physical location, and provides the information to a 911 tandem that is located in the PSTN network. The packet network service provider may simply obtain the physical service address that was previously provided by the customer when the customer initially subscribed to the service.

In turn, the local exchange carrier with the PSTN network delivers the information from the 911 tandem to the proper PSAP. In turn, the call, the telephone number and the caller's address flow from the VoIP or SoIP service provider towards the public safety answering point. However, since the customer can move the terminal adaptor to another physical location and to continue accessing services, the address obtained during the service subscription may no longer correspond to the current physical location of the caller and it becomes unusable for calls that rely on the physical location, e.g. E911 calls.

To address the present criticalities, the current invention discloses a method and apparatus for determining the location of terminal adaptors used to access services, such as VoIP and SoIP services. In one embodiment, the current invention enables the terminal adaptor to compare an IP address being used to access services with an IP address previously used for accessing services to determine whether or not the terminal adaptor may have been moved. If the IP address being used is not the same as a previous IP address, then the customer is requested to provide the primary telephone number for the physical location. The terminal adaptor then forwards the primary telephone number to the VoIP or SoIP service provider.

In order to clearly illustrate the teachings of the current invention, the following terminologies and networking concepts will first be described:

911 call;
911 tandem;
Public Safety Answering Point (PSAP);
Automatic Location Identification (ALI);
Automatic Number Identification (ANI); and
Enhanced 911 (E911).

A 911 call refers to a telephone call placed for the purpose of requesting emergency services. The public switched telephone network has been enabled to recognize specific telephone numbers as a call for emergency services. The telephone number used in North America is 911. The emergency call is delivered based on geographical location of the caller to a public safety answering point as defined below.

A 911 tandem refers to a switch that is used to connect telephone switching centers to the various public safety answering points. For example, when a wireless caller dials 911, the call is routed to a mobile switching center. The mobile switching center is connected to the 911 tandem that determines the appropriate public safety answering point that can best service the call and then routes the call accordingly.

Public Safety Answering Point (PSAP) refers to a location where emergency calls are received and distributed to the appropriate emergency services such as the fire department, ambulance service, police dispatch locations, etc. The services that belong in a particular PSAP vary by community. The Incumbent Local Exchange Carrier (ILEC) manages the telephone equipment such as the 911 tandem that routes the call to the appropriate public safety answering point.

Automatic Location Identification (ALI) refers to a technology used to determine the geographical location of the source of emergency calls. For example the caller may provide the location of the device being used to the service provider when the service is activated.

Automatic Number Identification (ANI) refers to a technology used to determine the callback number of the source of emergency calls. The call and the telephone number are transmitted in the network to enable the service providers to determine the source of the call. The 911 tandem can read the ANI information and provide it to the PSAP.

Enhanced 911 (E911) refers to an enhancement of technology required by the Federal Communications Commission (FCC) to enable mobile devices such as cellular phones to process 911 calls, and enable the public safety answering point to determine the ANI and the ALI. If the call is disconnected, the ANI is used to call back the user. The ALI is used to determine the physical location of the caller. Hence, the ANI and ALI are used to facilitate emergency services even in cases where the caller may not be able to communicate or provide location information. For example, if the caller is a child, the ALI and ANI may be the only way to dispatch emergency service providers to the location.

Traditionally, when a customer originates a call using an analog device, the analog device is attached to a terminal adaptor that is, in turn, connected to either a router or directly to a broadband modem, e.g., a cable or a Digital Subscriber Line (DSL) modem. The modem used for broadband access remains stationary.

However, when a VoIP or SoIP customer moves from one physical location to another physical location, and wishes to continue accessing services, the customer may simply move the terminal adaptor to the new location. Therefore, the terminal adaptor is then attached to another router or broadband modem at the new physical location. In one embodiment, the present invention provides a method for the terminal adaptor to detect a potential change in the physical address of the customer and to obtain the new address information from the customer such that services such as E911 may be delivered appropriately, if necessary.

Figure 2:
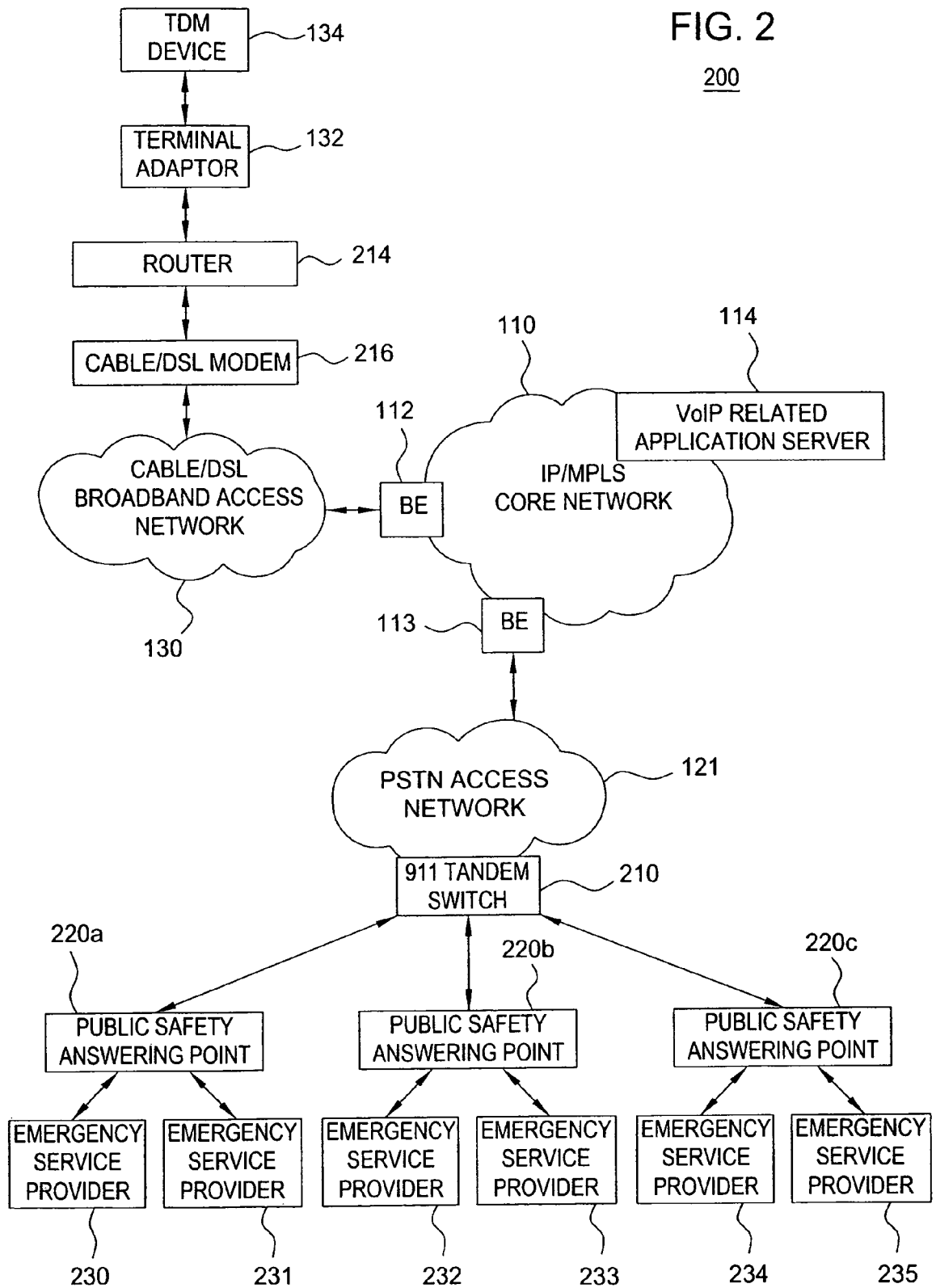
FIG. 2 illustrates an exemplary network with one embodiment of the invention for determining the location of a terminal adaptor.

FIG. 2 illustrates an exemplary network 200 with one embodiment of the present invention for determining the location of terminal adaptors. For example, a customer is using a TDM device 134 to originate an emergency call, e.g., a 911 call. The TDM device 134 is connected to a terminal adaptor 132 and the terminal adaptor 132 is connected to a broadband cable or DSL modem 216 through a router 214. The broadband modem 216 is connected to a broadband DSL or cable access network 130. It should be noted that in an alternative embodiment, the terminal adaptor 132 as illustrated in FIG. 2 can be directly connected to the broadband modem 216 without the router 214.

The packets transmitted by the TDM device 134 traverse the access network 130 and reach an IP/MPLS core network 110 through a border element 112. The packets then traverse the core network 110 from border element 112 to a border element 113. Border element 113 is connected to a PSTN access network 121. The PSTN network routes the 911 call to a 911 tandem switch 210.

In one embodiment, the 911-tandem switch is connected to a plurality of Public Safety Answering Points (PSAPs) 220a, 220b and 220c. The 911 tandem switch forwards the 911 call to the closest public safety answering point based on the physical location of the caller. The public safety answering points 220a, 220b and 220c are, in turn, connected to the emergency service providers 230, 231, 232, 233, 234 and 235. Each community will determine the emergency services such as the local police department, ambulance service, fire department, and the like to be connected to the PSAP. Thus, a user using a TDM device 134 is able to originate an emergency call that will be routed to a proper PSAP that will be able to service the emergency call.

In one embodiment, an application server, e.g., a VoIP application server 114, located in the IP/MPLS core network 110 is utilized for providing services to the users. In one embodiment, the terminal adaptor 132 determines a change in its physical location and provides the new location information to the application server 114. Specifically, the application server 114 (e.g., deploying a network agent application) is capable of interacting with a plurality of terminal adaptors to receive updates in physical location. The application server 114 validates the received physical locations and updates the databases. Thus, when the service provider receives a service request that relies on physical location (e.g. an E911 call), the call and the up-to-date physical location information are forwarded towards a proper destination. For example, E911 calls are forwarded to the closest PSAP according to the physical location of the terminal adaptor.

In one embodiment, the terminal adaptor of the current invention compares a current IP address that is being used to access services with an IP address that was previously used for accessing services to determine whether or not the terminal adaptor may have been moved (e.g., a potential change in physical location). When a customer moves the terminal adaptor to the new location and attaches it to another broadband modem or router, the terminal adaptor discovers the IP address being used to access services. If the previously used IP address, and the current IP address (the IP address discovered) are not the same, the terminal adaptor will inform the user to provide a primary telephone number associated with the physical location.

To illustrate, if the user provides a primary telephone number that is the same as the previously known telephone number, the physical location for the terminal adaptor remains the same. For example, if a user moves the terminal adaptor from one room to another room in the same residence with multiple IP addresses, the primary telephone number for the physical location remains the same. However, if the user provides a new primary telephone number, the terminal adaptor will provide the new primary number to the network service provider. For example, if a customer is accessing services from a hotel room, the customer provides the hotel's telephone number as the primary telephone number for the location. The service provider may then update its records and will now be able to forward future calls that must be routed based on physical location to the correct destination (e.g. E911 calls). For the example above, if the VoIP or SoIP customer dials 911 from the hotel room, the VoIP service provider will forward the call, the telephone number and the caller's new physical location to the 911 tandem located in the PSTN network. The local exchange carrier with the PSTN network delivers the information from the 911 tandem to the PSAP closest to said physical location.

Figure 3:
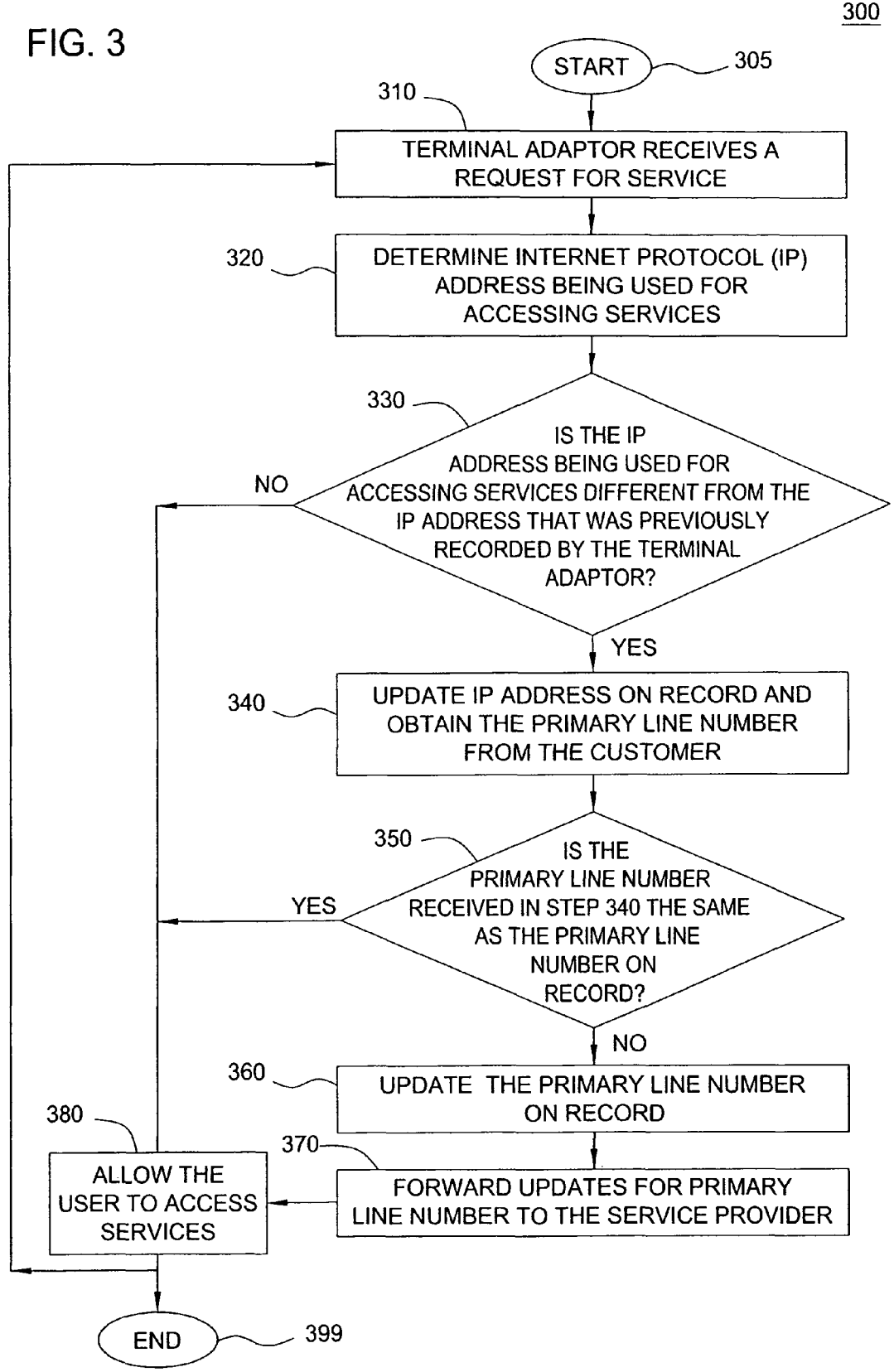
FIG. 3 illustrates a flowchart of a method for determining the location of a terminal adaptor.

FIG. 3 illustrates a flowchart of a method 300 for determining the location of a terminal adaptor. For example, method 300 can be implemented by a terminal adaptor.

Method 300 starts in step 305 and proceeds to step 310. In step 310, the terminal adaptor receives a request for service. For example, the customer initiates a telephone call using an endpoint device attached to the terminal adaptor.

In step 320, method 300 determines the IP address that is currently being used for accessing services, e.g., the IP address of a current router or broadband modem being used to access the Internet and IP services. In one embodiment, a router may be used to handle the sharing of the Internet connection, where the router's address translation capability allows multiple computers and analog devices to access the Internet using a single public IP address. When analog phones are used to access VoIP services, the devices are connected to the terminal adaptor. The terminal adaptor is then connected to the router. In another embodiment, the terminal adaptor is connected to the broadband modem directly to access the Internet without a router. In both cases, all devices sharing the Internet connection through the broadband modem share the IP address. The method 300 reads the IP address used to access the services and proceeds to step 330.

In step 330, method 300 determines whether or not the IP address that is currently being used is different from the IP address that was previously recorded by the terminal adaptor. For example, the method compares the received IP address in step 320 with a previously known IP address, e.g., an IP address that was previously used to service a call request. If the current IP address is different from a previously used IP address, then the method proceeds to step 340 to determine the primary line number for the location. Otherwise, the method proceeds to step 380 to allow the user to access services. Namely, if the customer moved the terminal adaptor to another location, there is a strong possibility that the IP address will be different from the IP address that was used for a previous call.

In step 340, method 300 updates the IP address on record and obtains customer input, e.g., a primary line number from the customer. For example, the terminal adaptor stores the current IP address and requests the customer to enter a primary line number associated with the current physical location of the terminal adaptor. The newly stored IP address may then be used for comparison for future calls. In one embodiment, the terminal adaptor presents to the customer the previously known primary line number and requests the customer to confirm the primary line number (e.g., "Is the primary line number xxx-xxx-xxxx still a primary number for your current physical location?"). In another embodiment, the terminal adaptor requests the customer to enter the primary line number without providing the previously known primary line number (e.g., "Please enter the primary line number for your current physical location.").

In step 350, method 300 determines whether or not the primary line number received in step 340 is the same as the primary line number on record (e.g., as stored by the terminal adaptor). If the primary line number is the same, the method proceeds to step 380 to allow the user to access services. The premise is that although the customer is using a different IP address to access the VoIP service, the customer is still at the same physical location since the primary line number has not changed. Otherwise, the method proceeds to step 360.

It should be noted that method 300 may optionally deny access to any network services if the requested customer input is not received. Namely, if method 300 determines that there has been a change in the IP address, but no input from the user is received as to the current primary line number, then method 300 may optionally deny access to any network services. Although this may be a drastic approach, a network service provider may optionally deem the requirement to provide up-to-date location information as an important basis to receive access to network services.

In step 360, method 300 updates the primary line number on record with the Terminal Adaptor. For example, the terminal adaptor records the primary line number. The new primary line number may then be used for comparison for future calls.

In step 370, method 300 forwards updates for the primary line number to the service provider. For example, the terminal adaptor sends the updated primary line number to an application server in the service provider's network used to provide services to the customer.

In step 380, method 300 allows the user to access services. The method then proceeds to step 399 to end processing the current request or returns to step 310 to continue receiving other requests.

Figure 4:
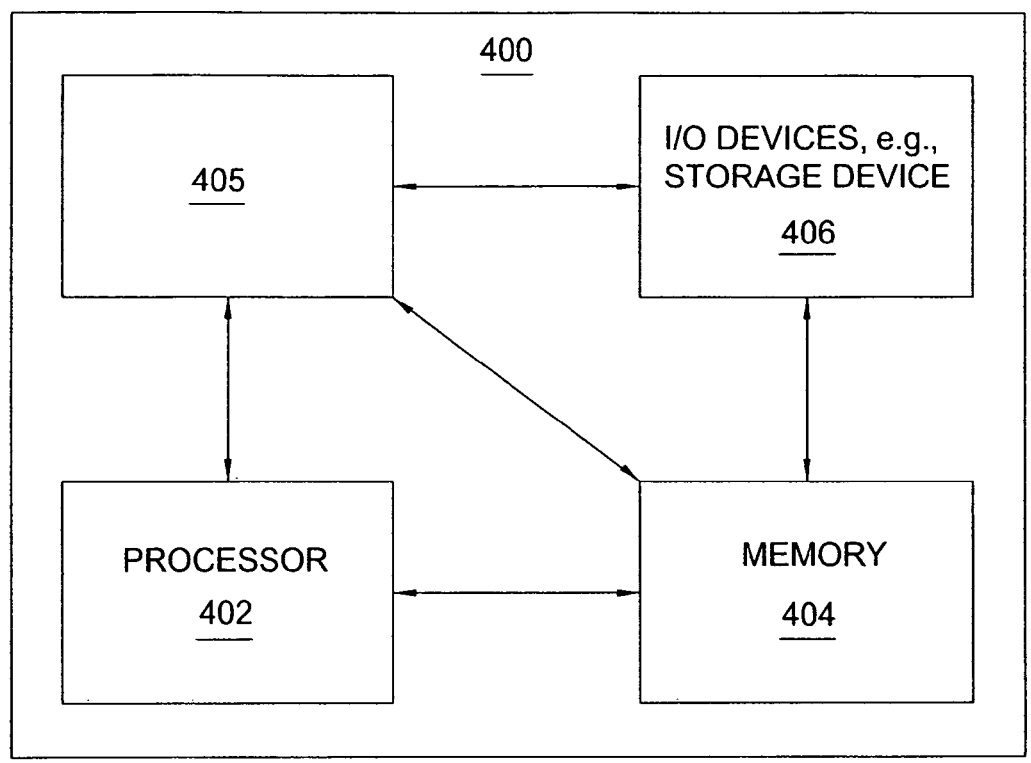
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for determining a location of a terminal adaptor, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for determining a location of a terminal adaptor can be loaded into memory 404 and executed by processor 402 to implement the functions as discussed above. As such, the present method 405 for determining a location of a terminal adaptor (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for updating location information of a customer, comprising:

receiving, by a processor of a terminal adapter, a request from the customer for accessing a network service;

detecting, by the processor, a change in an internet protocol address associated with the customer in the request;

requesting, by the processor, the customer to provide an input relating to location information of the customer, wherein the input comprises a primary telephone number; and comparing, by the processor, the primary telephone number to a previously known primary telephone number, wherein the primary telephone number being same as the previously known primary telephone number indicates that the terminal adapter has moved from a first room to a second room within a residence location of the customer and the primary telephone number being different than the previously known primary telephone number indicates that the terminal adapter has changed locations from the residence location to a different physical location.

2. The method of claim 1, further comprising:
receiving the input; and
storing the input.

3. The method of claim 1, further comprising:
determining from the input that there is an update relating to the location information of the customer; and
sending the update relating to the location information of the customer to a network service provider of the network service.

4. The method of claim 3, wherein the network service provider is an internet protocol network service provider.

5. The method of claim 1, wherein the network service comprises an internet protocol service.

6. The method of claim 1, further comprising:
denying the customer from accessing the network service if the input is not received.

7. The method of claim 1, wherein the requesting comprises:
presenting a previously known location information to the customer for confirmation.

8. The method of claim 1, wherein the internet protocol address comprises an internet protocol address of a modem.

9. The method of claim 8, wherein the modem comprises a broadband access modem.

10. The method of claim 9, wherein the broadband access modem comprises a cable modem.

11. The method of claim 1, wherein the requesting further comprises:
requesting the customer to input a current location information.

12. The method of claim 1, wherein the internet protocol address comprises an internet protocol address of a router.

13. A non-transitory computer-readable medium storing a plurality of instructions, which when executed by a processor of a terminal adapter, cause the processor to perform operations for updating location information of a customer, the operations comprising:
receiving a request from the customer for accessing a network service;
detecting a change in an internet protocol address associated with the customer in the request;
requesting the customer to provide an input relating to location information of the customer, wherein the input comprises a primary telephone number; and
comparing the primary telephone number to a previously known primary telephone number, wherein the primary telephone number being same as the previously known primary telephone number indicates that the terminal adapter has moved from a first room to a second room within a residence location of the customer and the primary telephone number being different than the previously known primary telephone number indicates that the terminal adapter has changed locations from the residence location to a different physical location.

14. The non-transitory computer-readable medium of claim 13, further comprising:
receiving the input; and
storing the input.

15. The non-transitory computer-readable medium of claim 13, further comprising:
determining from the input that there is an update relating to the location information of the customer; and
sending the update relating to the location information of the customer to a network service provider of the network service.

16. The non-transitory computer-readable medium of claim 13, further comprising:
denying the customer from accessing the network service if the input is not received.

17. The non-transitory computer-readable medium of claim 13, wherein the Internet protocol address comprises an internet protocol address of a modem.

18. The non-transitory computer-readable medium of claim 17, wherein the modem comprises a broadband access modem.

19. The non-transitory computer-readable medium of claim 18, wherein the broadband access modem comprises a cable modem.

20. A terminal adapter for updating location information of a customer, comprising:
a processor; and
a computer-readable medium storing a plurality of instructions which, when executed by the processor, cause the processor to perform operations, the operations comprising:
receiving a request from the customer for accessing a network service;
detecting a change in an internet protocol address associated with the customer in the request;
requesting the customer to provide an input relating to location information of the customer, wherein the input comprises a primary line telephone number; and
comparing the primary telephone number to a previously known primary telephone number, wherein the primary telephone number being same as the previously known primary telephone number indicates that the terminal adapter has moved from a first room to a second room within a residence location of the customer and the primary telephone number being different than the previously known primary telephone number indicates that the terminal adapter has changed locations from the residence location to a different physical location.

\* \* \* \* \*